US011192033B1

(12) United States Patent
Koch et al.

(10) Patent No.: US 11,192,033 B1
(45) Date of Patent: Dec. 7, 2021

(54) SYSTEMS AND METHODS FOR PROVIDING AND USING PROOF OF IN-GAME PARTICIPATION BY UNIQUE DIGITAL ARTICLES

(71) Applicant: MYTHICAL, INC., Sherman Oaks, CA (US)

(72) Inventors: Rudy Koch, Sammamish, WA (US); John Linden, Sherman Oaks, CA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

(21) Appl. No.: 17/327,653

(22) Filed: May 21, 2021

(51) Int. Cl.
    *A63F 13/73* (2014.01)
    *A63F 13/79* (2014.01)
    *A63F 13/35* (2014.01)

(52) U.S. Cl.
    CPC ............ *A63F 13/79* (2014.09); *A63F 13/35* (2014.09)

(58) Field of Classification Search
    CPC .......... A63F 13/79; A63F 13/35; G06Q 30/02
    USPC ......................................................... 463/42
    See application file for complete search history.

(56) References Cited

U.S. PATENT DOCUMENTS

| | | |
|---|---|---|
| 6,591,250 B1 | 7/2003 | Johnson |
| 8,972,369 B2 | 3/2015 | Vignocchi |
| 9,430,791 B1 | 8/2016 | Sutton-Shearer |
| 11,044,098 B1 | 6/2021 | Thacker |
| 11,062,284 B1 | 7/2021 | Cunningham |
| 11,154,783 B1 | 10/2021 | Koch |
| 2009/0276332 A1* | 11/2009 | Gharabally ........ G06Q 30/0601 705/26.1 |
| 2011/0302037 A1 | 12/2011 | Sutton-Shearer |
| 2014/0094283 A1 | 4/2014 | Sanford |
| 2015/0310476 A1 | 10/2015 | Gadwa |
| 2016/0098723 A1 | 4/2016 | Feeney |
| 2016/0140653 A1 | 5/2016 | McKenzie |
| 2016/0292680 A1 | 10/2016 | Wilson, Jr. |
| 2016/0325180 A1 | 11/2016 | Nelson |
| 2017/0052676 A1* | 2/2017 | Pulier ................. G06F 3/04883 |
| 2017/0206523 A1 | 7/2017 | Goeringer |
| 2018/0062848 A1 | 3/2018 | Gorman |
| 2018/0255090 A1 | 9/2018 | Kozloski |
| 2019/0205894 A1 | 7/2019 | Gonzales, Jr. |
| 2019/0299105 A1* | 10/2019 | Knight ................ G07F 17/3244 |
| 2020/0294011 A1 | 9/2020 | Robertson |

(Continued)

OTHER PUBLICATIONS

Koch, Rudy; "Introducing dGoods", Feb. 10, 2019 (Year: 2019).*

(Continued)

*Primary Examiner* — Michael A Cuff
(74) *Attorney, Agent, or Firm* — Esplin & Associates, PC

(57) ABSTRACT

Systems and methods to provide and use proof of in-game participation by unique digital articles are disclosed. Exemplary implementations may execute instances of a game; manage player accounts associated with the players; record usage information pertaining to player-owned unique digital articles on a permanent registry; determine whether in-game player-controllable virtual items participated in in-game events; generate sets of video information depicting the in-game player-controllable virtual items participating in the in-game events; and record references to the sets of video information on the permanent registry such that the video information is accessible for viewing by users of the permanent registry.

20 Claims, 5 Drawing Sheets

(56) References Cited

U.S. PATENT DOCUMENTS

2021/0174625 A1* 6/2021 Pinkerton ............... G06F 16/27
2021/0201336 A1* 7/2021 Mallett .............. G06Q 30/0201

OTHER PUBLICATIONS

Brightman, James; "Activision Blizzard Vets Launch Mythical Games With Focus On Player-Owned Economies"; GameDaily.biz, Nov. 16, 2018. (Year: 2018).*
Business Wire; "Mythical Games Announces integration of Microsoft Azure Blockchain Tokens with dGoods Standard"; Bloomberg, Nov. 6, 2019. (Year: 2019).*

* cited by examiner

SYSTEMS AND METHODS FOR PROVIDING AND USING PROOF OF IN-GAME PARTICIPATION BY UNIQUE DIGITAL ARTICLES

FIELD OF THE DISCLOSURE

The present disclosure relates to systems and methods for providing and using proof of in-game participation by either unique digital articles, correlated in-game player-controllable virtual items (e.g., characters), or both.

BACKGROUND

Online gaming platforms are known. Many types of digital articles are known. Distributed registries are known techniques to produce a secure record or registry of rights pertaining to assets or articles, transactions, and other information.

SUMMARY

One aspect of the present disclosure relates to a system configured to provide and use proof of in-game participation (e.g., participation in in-game events and/or otherwise being part of the in-game events) by unique digital articles. The unique digital articles are associated with in-game player-controllable virtual items configured to be used in instances of games within an online gaming platform. The system may include the online gaming platform, a registry server, and/or other components. The system may include one or more processors configured by machine-readable instructions. The system may be configured to execute, within the online gaming platform, an instance of a game to facilitate presentation of the game to players, and implement in-game actions in the instance of the game in response to in-game action instructions for the in-game actions by the players. Presentation of the game is based on views of the game that are determined during execution of the instance of the game. The players may include a first player and a second player. The system may be configured to manage player accounts associated with the players. The player accounts may include a first player account associated with the first player and a second player account associated with the second player. The first player account may include a first account inventory of a first set of virtual items. The second player account may include a second account inventory of a second set of virtual items. The first player controls the first set of virtual items in the first account inventory. The second player controls the second set of virtual items in the second account inventory. The first account inventory may include a first unique digital article that is associated with a first in-game player-controllable virtual item configured to be used in the instance of the game. The second account inventory may include a second unique digital article that is associated with a second in-game player-controllable virtual item configured to be used in the instance of the game. The system may be configured to generate and transfer sets of instructions to record and/or modify a first set of usage information pertaining to the first unique digital article and a second set of usage information pertaining to the second unique digital article. The first set of usage information may include first metadata specific to the first unique digital article. The system may be configured to implement a permanent registry. The system may be configured to receive and execute (i) a first set of instructions to record, on the permanent registry, the first set of usage information that controls usage by the first player of the first unique digital article, and (ii) a second set of instructions to record, on the permanent registry, the second set of usage information. The second set of usage information controls usage by the second player of the second unique digital article. The system may be configured to determine whether the first in-game player-controllable virtual item participated in a first in-game event (e.g., used actively and/or passively in the first in-game event). The system may be configured to generate a first set of video information, wherein the first set of video information depicts the first in-game player-controllable virtual item participating in the first in-game event. The system may be configured to store the first set of video information at a first location in electronic storage. The system may be configured to generate and transfer a first set of instructions to modify the first metadata. The system may be configured to receive and execute the first set of instructions to record, on the permanent registry, a first modification of the first metadata. The first modification may add a Uniform Resource Locator (URL) that refers to the first location of the first set of video information.

Another aspect of the present disclosure related to a method of providing and using proof of in-game participation by unique digital articles, wherein the unique digital articles are associated with in-game player-controllable virtual items usable in instances of games within an online gaming platform. The method may include executing, within the online gaming platform, an instance of a game to facilitate presentation of the game to players, and implementing in-game actions in the instance of the game in response to in-game action instructions for the in-game actions by the players. Presentation of the game is based on views (or view information) of the game that are determined during execution of the instance of the game. The players may include a first player and a second player. The method may include managing player accounts associated with the players. The player accounts may include a first player account associated with the first player and a second player account associated with the second player. The first player account may include a first account inventory of a first set of virtual items. The second player account may include a second account inventory of a second set of virtual items. The first player controls the first set of virtual items in the first account inventory. The second player controls the second set of virtual items in the second account inventory. The first account inventory may include a first unique digital article that is associated with a first in-game player-controllable virtual item configured to be used in the instance of the game. The second account inventory may include a second unique digital article that is associated with a second in-game player-controllable virtual item configured to be used in the instance of the game. The method may include generating and transferring sets of instructions to record and/or modify a first set of usage information pertaining to the first unique digital article and a second set of usage information pertaining to the second unique digital article. The first set of usage information may include first metadata specific to the first unique digital article. The method may include receiving and executing (i) a first set of instructions to record, on a permanent registry implemented by a registry server, the first set of usage information. The first set of usage information controls usage by the first player of the first unique digital article, and (ii) a second set of instructions to record, on the permanent registry, the second set of usage information. The second set of usage information controls usage by the second player of the second unique digital article. The method may include determining whether the first in-game player-controllable virtual item participated in a first in-game event. The method may include generating a first set of video information, wherein the first set of video information depicts the first in-game player-controllable virtual item participating in the first in-game event. The method may include storing the first set of video information at a first location in electronic storage. The method may include generating and transferring a first set of instructions to modify the first metadata. The method may include receiving and executing the first set of instructions to record, on the permanent registry, a first modification of the first metadata. The first modification may add a Uniform Resource Locator (URL) that refers to the first location of the first set of video information.

As used herein, any association (or relation, or reflection, or indication, or correspondency, or correlation) involving servers, processors, client computing platforms, players, player accounts, inventories, articles, digital articles, requests, manners of usage, exchanges, challenges, offers, in-game actions, video information, accessibility, sensitivities, locations, awards, adjustments, ownership, permanent registries, responses, denials, contracts, metrics, metric values, scores, gains, trigger events, incentives, proposals, sets of instructions, operations, determinations, distributions, transfers, transactions, presentations, interfaces, notifications, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
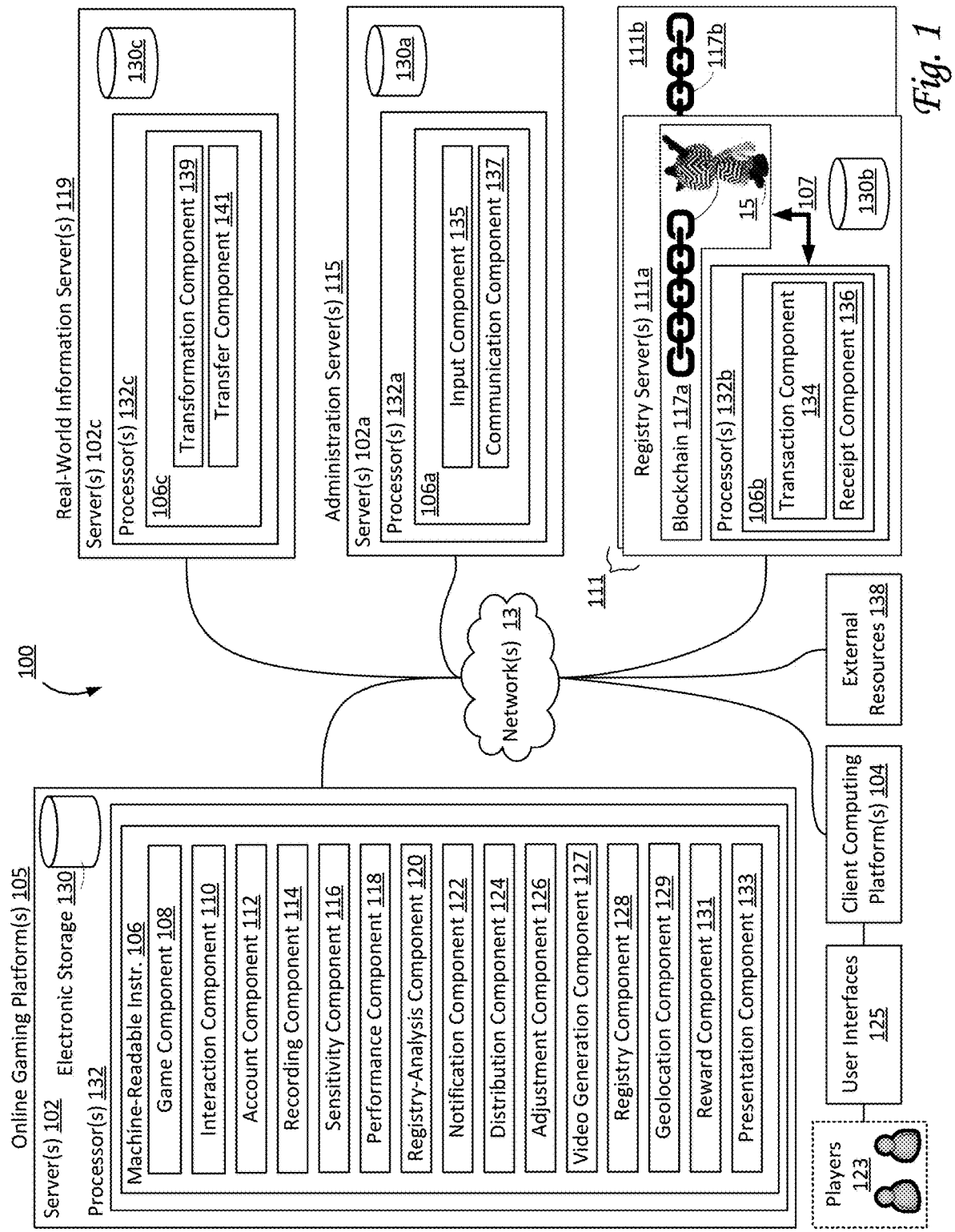
FIG. 1 illustrates a system configured to provide and use proof of in-game participation by unique digital articles, in accordance with one or more implementations.

FIG. 1 illustrates a system 100 configured to provide and use proof of in-game participation by unique digital articles in (noteworthy) events, in accordance with one or more implementations. In some implementations, this proof may be in the form of video information (e.g., video clips). The video information may depict a particular in-game player-controllable virtual item (e.g., a player-controllable character) participating in a particular in-game event. Alternatively, and/or simultaneously, the video information may depict a particular unique digital article or player participating in a particular in-game event. By virtue of the systems and methods described in this disclosure, this video information may be associated and/or otherwise linked to the particular unique digital article and/or its associated particular in-game player-controllable virtual item. Accordingly, anyone can access this video information, and thereby verify the proof, and verify this particular unique digital article and/or its associated particular in-game player-controllable virtual item participated in the particular in-game event as depicted in this video information. For example, a particular player-controllable character may take part in the particular in-game event as a participant, and a particular virtual item such as a magical sword may be used in the particular in-game event. Accordingly, both the player-controllable character and the particular virtual item participated in the particular in-game event.

In some implementations, selection of these events may be automated within online-gaming platform(s) 105 (by way of non-limiting example, every time a player beats a particular level or opponent). Alternatively, and/or simultaneously, these events may be selected by users and/or players in online-gaming platform(s) 105 that organize, host, perform at, and/or otherwise are related to the events themselves (by way of non-limiting example, an online party, concert, or celebration). In some implementations, these events may be selected by an operator or administrative user or other stakeholder of online gaming platform 105.

As used herein, the term "unique digital article" may refer to digital articles that are uniquely identified and/or uniquely identifiable, e.g., by an identifier or by identifying information. For example, in some implementations, an identifier or identifying information may include or be based on a combination of different types of information, including but not limited to information regarding the type of a digital article, a serial number and/or other numerical identifier of the digital article, and/or other types of information. As used herein, rights pertaining to unique digital articles may be tracked, recorded, and/or otherwise registered on one or more permanent registries. As such, a unique digital article may be a registry-tracked unique digital article. In some cases, these rights may include ownership. As used herein, a registry is referred to as "permanent" when recorded information is expected to be immutable, and can substantially not be altered or deleted (unless one or more of the fundamental principles underlying these registries is cracked, hacked, broken, and/or otherwise reverse-engineered). For example, these registries rely on certain one-way hashing functions that are expected to remain secure.

Individual unique digital articles may be associated and/or correlated with another entity (which may be referred to as a "correlated entity") by virtue of technology provided and/or supported by the one or more permanent registries on which usage information (e.g., rights) pertaining to the individual unique digital articles is tracked (including but not limited to smart contracts and/or other executable code on the one or more permanent registries). Accordingly, usage information pertaining to a unique digital article may correlate to the provision of one or more rights with respect to the correlated entity (e.g., control and/or other accessibility). Transactions involving a unique digital article recorded on a permanent registry may correlate to certain transactions (or modifications) of the correlated entity, and/or vice versa.

In some implementations, correlated entities may be (or include) virtual items configured to be used within online-gaming platform 105 (such as, for example, a player-controllable in-game virtual item or character that is usable within an instance of a game within online gaming platform 105). Other types and/or combinations of correlated entities are envisioned within the scope of this disclosure, including but not limited to physical and/or virtual objects, items, rights, memberships, grants, etc. The use of the singular "entity" or "correlated entity" is not intended to be limiting, as multiple different objects, items, rights, memberships, grants, etc. may be correlated to a single unique digital article. By way of non-limiting example, a correlated entity may be an art work, a ticket to an event, a subscription to certain media content, a bundle of rights related to captured (or generated) audio and/or video information, ownership of or accessibility to distribution gains, and so forth. As used herein, the term "non-fungible token" or "NFT" may be used to refer to a combination of a particular unique digital article and a particular correlated entity that is correlated to the particular unique digital article.

System 100 may include one or more of online gaming platform(s) 105, registry server(s) 111, administration server(s) 115, real-world information server(s) 119, client computing platform(s) 104, user interface(s) 125, server(s) 102, external resource(s) 138, and/or other components. Some implementations use fewer components. Players 123 (also referred to as users) may include one or more of a first player, a second player, a third player, a fourth player, an administrative user, and/or other players. Players 123 may include players who play and/or otherwise interact on online gaming platform 105. As used in descriptions herein, any use of the term "player" may refer to player(s) 123. Electronic storage 130*a*, electronic storage 130*b*, and electronic storage 130*c* may be similar to electronic storage 130 as described elsewhere in this disclosure, though included in administration servers 115, registry servers 111, and real-world information servers 119, respectively, as depicted in FIG. 1.

Instances of games may be executed within one or more online gaming platforms 105. As used herein, online gaming platform(s) 105 may refer to either an individual game (e.g., an interactive online game), a type of gaming console and its ecosystem, and/or both. Online gaming platform 105 may be configured to host (and/or execute instances of) the one or more (online) games. Online gaming platform 105 may be operated, hosted, and/or owned by one or more stakeholders of online gaming platform 105. For example, a platform operator (and/or another stakeholder) may sell in-game digital items (e.g., characters, weapons, vehicles, mounts, totems, resources, etc.) to players 123 of online gaming platform 105.

Referring to the game and to online gaming platform 105, in some implementations, individual players may own and/or control individual unique digital articles, correlated entities, and/or other virtual items, and exchange these with (or to) other individual players. As used herein, exchanges refer to individual players winning, losing, auctioning, selling, purchasing, trading, bartering, wagering, staking, and/or otherwise exchanging virtual items (directly, without a store or store interface under control of online gaming platform 105) to other individual players or with other individual players. Due to an exchange, ownership rights of a digital article may transition from an original owner to a new owner (even if there may, in some implementations, be one or more intermediary and/or temporary owners during the process of performing the exchange). In some implementations, unique digital articles may be associated and/or correlated with other rights than ownership rights, such as, by way of non-limiting example, distribution rights.

In some implementations, distribution rights of (unique) digital articles may reflect rights held by the individual ones of the players 123 to receive certain distributions of awards (also referred to as benefits) upon exchanges involving the particular digital articles. For example, individual players 123 may own rights related to particular digital articles that guarantee them awards upon (future) exchanges involving those digital articles regardless of whether the individual players 123 own those digital articles (at the time of the particular exchange). In some implementations, the distribution gains may result from a particular action or activity (such as, e.g., a sale of a particular digital article), e.g., within the online gaming platform 105, of a particular digital article. As used herein, a distribution gain resulting from a particular action or activity may include one or more of a portion of the proceeds of the particular action or activity, a fee related to the particular action or activity, a minimum payment triggered by the occurrence of the particular action or activity (or a set of particular actions or activities), and/or another arrangement for payment and/or compensation, including but not limited to combinations of fixed fees, minimum fees, percentages of sales, percentages of profits, and/or other arrangements. The term "portion" does not imply or require a percentage or ratio, but rather is intended to signify that beneficiaries (i.e., the players that hold the distribution rights) may receive something of value and/or use. The distribution gains may include one or more virtual currencies such as virtual tokens, virtual stars, virtual points, virtual real-world currencies (e.g., US Dollars), and/or other gains that are based on the particular digital articles.

In some implementations, (unique) digital articles, correlated entities, and/or other virtual items may include and/or be virtual items that are not fungible and may be usable within online gaming platform 105. In some implementations, these may represent (three-dimensional) in-game player-controllable characters that can interact with other (in-game) virtual items (e.g., characters) within online gaming platform 105. In some implementations, virtual items may include one or more of weapons, toys, characters, abilities, skills, tools, pets, clothing, vehicles, mounts, game levels, missions, assignments, chapters, tasks, mini-games, restricted areas within a virtual space, restricted modes of gameplay, access rights within an online game, and/or other virtual items. In some implementations, virtual items may refer to any item or object within online gaming platform 105 for which a player may use, own, sell, trade, destroy, and/or otherwise effectuate a change of ownership or control.

As used herein, a digital article is fungible if it is functionally and/or physically indistinguishable from another digital article. For example, a payment token such as a Bitcoin is fungible. A digital article may be non-fungible if it is unique, or one-of-a-kind. For example, a specific individual Crypt® Kitty™ may be non-fungible. A digital article may be semi-fungible if there is a set of a limited number of similar but distinguishable digital articles. For example, a limited-edition BlankO™ or another in-game character may be semi-fungible. For example, one of a limited number of 2-dimensional or 3-dimensional in-game virtual items may be semi-fungible. For example, a digital ticket to a show, concert, exhibition, and/or other event may be semi-fungible. For example, a piece of art or jewelry (e.g., as a virtual item or as representing a physical item) may be semi-fungible. As used herein, semi-fungible digital articles are considered as unique, "not fungible", or non-fungible digital articles. In some implementations, digital articles may be usable within one or more games.

Registry server(s) 111 (e.g., registry server 111a, registry server 111b, and so forth) may be used to implement one or more permanent registries, including but not limited to blockchain 117a, blockchain 117b (partially visible in FIG. 1), and so forth. In some implementations, one or more permanent registries may be decentralized and/or immutable registries. In some implementations, blockchain 117a and blockchain 117b may be maintained by distributed computing platforms (not shown in FIG. 1). In some implementations, a distributed computing platform may be implemented by a set of client computing platforms and/or servers (including, for example, one or more registry servers 111). The distributed computing platform may support a virtual machine (not shown in FIG. 1). The distributed computing platform and/or the virtual machine may form a runtime environment for smart contracts and/or other executable code. A distributed computing platform may include electronic storage configured to store part or all of blockchain 117a. For example, the smart contracts may be stored on blockchain 117a, blockchain 117b, and/or another permanent registry. In some implementations, the distributed computing platform may be the EOSIO platform. In some implementations, the distributed computing platform may be similar to or based on the EOSIO platform. In some implementations, the distributed computing platform may be Ethereum. In some implementations, the distributed computing platform may be similar to or based on Ethereum. In some implementations, the virtual machine may be a distributed and/or decentralized virtual machine.

In some implementations, at least one of the permanent registries implemented by registry servers 111 is a private permissioned permanent registry (e.g., a private permissioned blockchain). The private permissioned permanent registry may be configured to record information. The recorded information may include (usage) information pertaining to unique digital articles that are associated and/or correlated with in-game player-controllable virtual items that are configured to be used in an instance of a game. The recorded information may include rights pertaining to the unique digital articles. Implementing the in-game actions in the instance of the game may include, for at least some of the in-game actions implemented in the instance of the game, effectuating modifications to the recorded information pertaining to the unique digital article. For example, certain rights may be modified. In some implementations, a unique digital article may be removed from one permanent registry and added or recorded on another permanent registry. In some implementations, at least one of the permanent registries implemented by registry servers 111 is a public permanent registry (e.g., a public blockchain). The public permanent registry may be configured to be part of either EOSIO mainnet, Ethereum mainnet, Ethereum 1.5, Ethereum 2.0, a derivative of Ethereum 2.0 that is configured to perform transactions of Ether (ETH) between accounts, or a derivative of EOSIO that is configured to perform transactions of EOS between different accounts.

Elements of blockchain 117a or another permanent registry may be grouped together in units that are referred to as blocks. For example, an individual block may include one or more digital articles (or digital assets) and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more digital articles, one or more transactions, smart contracts, and/or other information.

In some implementations, one or more permanent registries implemented by registry servers 111 may be publicly accessible. In some implementations, one or more permanent registries implemented by registry servers 111 may be private and/or permissioned. In some implementations, one or more permanent registries implemented by registry servers 111 may be append-only (such that existing blocks are immutable once they have been added to the registry). In some implementations, existing blocks of one or more permanent registries implemented by registry servers 111 can substantially not be altered or deleted, unless multiple copies are altered. This is unlikely to happen provided that the multiple copies are stored on different computing platforms, e.g., in different geographical locations. Permanent registries may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or articles may be digitally signed in a manner that proves integrity and/or prevents tampering, e.g., by providing authentication, as well as non-repudiation.

As depicted in FIG. 1, registry server 111a may include one or more of electronic storage 130b, processor(s) 132b, machine-readable instructions 106b, (node of) blockchain 117a, and/or other components. Machine-readable instructions 106b may include one or more instruction components. The instruction components may include computer program components. The instruction components may include one or more of a transaction component 134, a receipt component 136, and/or other instruction components. In some implementations, an individual registry server may be dedicated to a particular node of a permanent registry. Typically, different nodes are included in (or implemented by, or hosted by) different servers or different computer systems to increase the safety and security of transactions on a blockchain. The consensus protocol used for a particular blockchain will be harder to falsify or circumvent when the different nodes are in different geographical locations, on different types of computing platforms, and/or otherwise distributed and diverse. As depicted in FIG. 1, blockchain 117a may include a unique digital article 15 (by way of non-limiting example, unique digital article 15 may be correlated with a player-controllable in-game character, as depicted, and rights pertaining to unique digital article 15 may have been recorded on blockchain 117a, as depicted). Registry server 111b may include similar components as registry server 111a, including but not limited to blockchain 117b and/or other components.

Real-world information server(s) 119 may include one or more of electronic storage 130c, processor(s) 132c, machine-readable instructions 106c, and/or other components. Machine-readable instructions 106c may include one or more instruction components. The instruction components may include computer program components. The instruction components may include one or more of a transformation component 139, a transfer component 141, and/or other instruction components. As used herein, the terms "real world" and "real-world information" refer to the physical world external to system 100 (and external to online gaming platform(s) 105, administration server(s) 115, registry server(s) 111, and real-world information server(s) 119), as well as information obtained therefrom and/or otherwise based thereon. By way of non-limiting example, real-world information may refer to quantifiable and/or deterministic data about events and/or activity that have/has occurred in the real world. By way of non-limiting example, results from competitions including sports are real-world information. Weather data, traffic information, stock prices, election results, results of real-world measurements, box office returns, financial market data, and thousands of other types of data are real-world information. In some implementations, an individual real-world information server 119 may be dedicated to a particular type of real-world information (e.g., a particular type of sport, or league, or team, or competition, or tournament, etc.). Real-world information servers 119 may be configured to determine information based on events that have occurred in the real world. This information may be referred to as real-world information. This information may be converted, packaged, and/or otherwise formatted so it can be transferred and used by other components of system 100, particularly by smart contracts recorded on permanent registries. In some implementations, real-world information may include geolocation information pertaining to the events that have occurred in the real world. For example, real-world information for a particular competition may include not only the results of that competition, but also geolocation information regarding the particular competition itself, or one or more competitor(s), and/or other locations that are related to this particular competition. In some cases, a real-world information server 119 may be referred to as an oracle or oracle server. A particular real-world information server 119 may operate as an immediate-read oracle, a publish-subscribe oracle, a request-response oracle, and/or as a different type of (blockchain) oracle.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Players may access system 100 via client computing platform(s) 104. In some implementations, system 100 and/or registry server(s) 111 may be configured to communicate with one or more of online gaming platform(s) 105, players 123, and/or other entities and/or components, e.g., through one or more networks 13.

Server(s) 102 may include electronic storage 130, processor(s) 132, machine-readable instructions 106, and/or other components. Server(s) 102 may be configured by machine-readable instructions 106. Machine-readable instructions 106 may include one or more instruction components. Instruction components (for any set of machine-readable instructions) may include computer program components. The instruction components may include one or more of a game component 108, an interaction component 110, an account component 112, a recording component 114, a sensitivity component 116, a performance component 118, a registry-analysis component 120, a notification component 122, a distribution component 124, an adjustment component 126, a video generation component 127, a registry component 128, a geolocation component 129, a reward component 131, a presentation component 133, transaction component 134, receipt component 136, an input component 135, a communication component 137, transformation component 139, transfer component 141, and/or other instruction components. Processor(s) 132a, processor(s) 132b, and processor(s) 132c may be similar to processor(s) 132 as described elsewhere in this disclosure, though included in administration servers 115, registry servers 111, and real-world information servers 119, respectively, as depicted in FIG. 1. Machine-readable instructions 106a, machine-readable instructions 106b, and machine-readable instructions 106c may be similar to machine-readable instructions 106 as described elsewhere in this disclosure, though included in administration servers 115, registry servers 111, and real-world information servers 119, respectively, as depicted in FIG. 1.

Game component 108 is configured to execute, via online gaming platform 105, one or more instances of one or more games. An instance of a game may facilitate presentation of the game to players 123. For example, the instance of the game may be an online game executed with online gaming platform 105. Game component 108 may be configured to implement in-game actions in the instance of the game, e.g., in response to (action) requests for the in-game actions by the players. In some implementations, game component 108 may be arranged, organized, and/or otherwise included in online gaming platform 105. As used herein, the term "game" may refer to one or more games within online gaming platform 105. In some implementations, the game may be provided via a virtual space, and may include a plurality of resource types and/or maps.

The presentation of the game may be based on the views (or view information) of the game that are determined during execution of the game, e.g., as based on instructions and/or other input from players. In some implementations, the view information may be communicated (e.g., by streaming, via object/position data, via game-state transformations, and/or other information) from online gaming platform(s) 105, registry server(s) 111, and/or other sources to client computing platforms 104 for presentation to players 123. In some implementations, online gaming platform(s) 105 may generate, capture, store, and/or otherwise record information regarding the execution of the game such that the view information that has been communicated to particular client computing platforms 104 may be re-created or at least approximated. In some implementations, the particular client computing platforms 104 may generate, capture, store, and/or otherwise record information regarding the execution of the game that is based on the view information that has been communicated to the particular client computing platforms 104, so that this view information may be recreated or at least approximated. The view information determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. In some implementations, one or more view parameters may be selectable by player 123.

The instance of the game may include a simulated space that is accessible by players 123 by clients (e.g., client computing platforms 104) that present the views of the virtual space to a player. The simulated space may have a topography, express ongoing real-time interaction by one or more players 123, and/or include one or more objects positioned within the topography that are capable of locomotion and/or movement within the topography. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the game, players 123 may control characters, objects, simulated physical phenomena, and/or other elements within the virtual space to interact with the virtual space and/or each other. The characters may include avatars. As used herein, the term "character" or "player character" may refer to an object or group of objects present in the virtual space, that correspond(s) to an individual player. A particular player character may be controlled by the particular player with which it is associated. Such player characters may be referred to as player-controlled or player-controllable characters. Player-controlled element(s) may move through and interact with the virtual space (e.g., non-player characters in the virtual space, other objects in the virtual space, etc.). In some implementations, player-controlled characters may be capable of locomotion within the topography of the simulated space that is included in the instance of the game. For example, different player-controllable characters may interact in the topography of the simulated space. In some implementations, the topography may include one or more restricted areas that are only accessible under certain conditions. In some implementations, player-controlled elements controlled by and/or associated with a given player may be created and/or customized by the given player. Individual players 123 and/or player accounts may own or control an inventory of virtual goods and currency (e.g., resources of a plurality of resource types) that the individual player can use (e.g., by manipulation of a player character and/or other player-controlled elements) and/or other items, to perform in-game actions within the virtual space. By way of non-limiting illustration, players 123 may include the first player and the second player that interact with online gaming platform 105. The first player and the second player may control digital articles in or through a game hosted by online gaming platform 105. In some implementations, account inventories may be managed (at least in part) using blockchain 117a. For example, ownership rights (and/or other types of rights) of individual virtual items included in an individual account inventory may be recorded on blockchain 117a. In some implementations, at least some individual virtual items (also referred to as correlated entities) may correlate to individual unique digital articles (these may be tracked by registry servers 111). In some implementations, individual account inventories may correspond to individual smart contracts stored on blockchain 117a.

In some implementations, players may be associated with particular locations in the real world. For example, once a particular player has checked in at a particular location in the real world, the particular player may be associated with that particular location, at least until a newer association is made. In some implementations, associations of players with particular locations may be in (pseudo-)real-time. For example, the current location of the particular client computing platform 104 that is being used to access system 100 and/or online gaming platform 105 may be associated with the particular player. In some implementations, players may be able to associate with a particular real-world location even if this is not their current actual location (e.g., by virtually attending an event that also has a real-world location, such as a concert). In one or more of the same ways, players may associate their unique digital articles with particular locations in the real world.

Interaction component 110 may be configured to enable, facilitate, and/or implement in-game actions by players 123 in instances of games. In some implementations, interaction component 110 may be configured to operate in response to instructions and/or (action) requests by players 123. Interaction component 110 may be configured to receive requests from players 123, e.g., in-game action instructions to perform in-game actions in the instance of the game. By way of non-limiting example, in-game actions may include one or more of performing a move, a dance, a movement, and/or another action within the game, accessing a level or area within the game, using a particular item, weapon, or another resource within the game, participating in a particular game mode (e.g., a Battle Royale mode, or team-versus-team mode), join a particular mission or team, engage in a particular type of exchange and/or challenge between players, and/or other in-game actions. For example, one or more players may interact within online gaming platform 105 to build, create, gather, find, combine, and/or otherwise generate content (i.e., player-generated content). In some implementations, a player request may request access to a particular type or section of a store and/or marketplace within online gaming platform 105.

In some implementations, operations may be accomplished by interaction component 110 through user interfaces 125. In particular, operations pertaining to a particular player may be accomplished or controlled or initiated through a particular user interface 125 of a particular client computing platform 104, where the particular client computing platform 104 is associated with the particular player. In other words, the particular player may interact with an instance of a game through interaction component 110 and/or the particular user interface 125. In some implementations, operations by interaction component 110 may be limited, restricted, and/or otherwise controlled by other components of system 100. In some implementations, interaction component 110 may require acceptance from particular players (e.g., to perform certain operations). For example, an acceptance may be required to accept a particular offer to partake in an activity or agreement. In some implementations, interaction component 110 may be configured to receive indications of acceptances and/or other agreements from players.

In some implementations, interaction component 110 may be configured to facilitate interaction of players 123 with system 100. In some implementations, interaction component 110 may be configured to facilitate interaction by players 123 through user interfaces 125. For example, a particular player may be associated with a particular client computing platform 104, which may include a particular user interface 125. In other words, an individual player interface 125 may be player-specific and/or specific to a particular client computing platform 104. In some implementations, interaction component 110 may facilitate entry and/or selection through (presentation of) one or more user interfaces 125 (such as, by way of non-limiting example, any of the interfaces described in this disclosure).

Account component 112 is configured to manage player accounts. Player accounts may be associated with players 123. Player accounts may include and/or be associated with account inventories of virtual items. For example, the player accounts may include a first player account associated with a first player, a second player account associated with a second player, and so forth. For example, the first player account may include a first account inventory of one or more virtual items, the second player account may include a second account inventory of one or more virtual items and so forth. Individual players may control one or more virtual items in their individual account inventories. In some implementations, the first account inventory includes one or more unique digital articles (e.g., a first unique digital article, other unique digital articles, etc.). In some implementations, the second account inventory includes one or more unique digital articles (e.g., a second unique digital article, other unique digital articles, etc.). The first unique digital article may be correlated with a first in-game player-controllable virtual item configured to be used (e.g., played with) in the instance of the game. The second unique digital article may be correlated with a second in-game player-controllable virtual item configured to be used (e.g., played with) in the instance of the game, and so forth. In some implementations, virtual items (e.g., unique digital articles) may be associated with location information (e.g., location within the simulated space of an instance of a game, or a real-world location).

Recording component 114 is configured to record information, assets, and/or (unique) digital articles on permanent registries. In some implementations, the information may include executable code, such as, e.g., smart contracts. In some implementations, recording component 114 may record and/or modify rights pertaining to articles. In some implementations, recording component 114 may be configured to receive (recordation) requests to perform a recordation (e.g., of a unique digital article or a smart contract on a permanent registry). For example, recording component 114 may receive, from a first player, a recordation request to record and/or modify usage information pertaining to a first unique digital article on a first permanent registry (such as, e.g., blockchain 117a). In some implementations, recording component 114 may receive such requests from online gaming platform 105 and/or other components of system 100. For example, a particular request to record (rights pertaining to) a particular unique digital article may correspond to the issuance and/or creation of that particular unique digital article. When a unique digital article or other digital article is issued and/or created, recording component 114 may record its ownership on a particular permanent registry. In some implementations, a particular request to modify rights pertaining to a particular unique digital article may correspond to an exchange of that particular unique digital article (e.g., between two players).

In some implementations, recording component 114 may be configured to record executable code on a particular permanent registry, such as, e.g., blockchain 117a. In some implementations, particular executable code may be a particular smart contract. The particular smart contract may interact with one or more real-world information servers 119. The particular smart contract may be configured to receive real-world information from one or more real-world information servers 119. The particular smart contract may be configured to perform one or more evaluations based on the received real-world information. In some implementations, smart contracts may be configured such that one or more evaluations are based, at least in part, on geolocation information associated with players or unique digital articles. In some implementations, the one or more evaluations may evaluate one or more consequences (e.g., in-game consequences). For example, a first evaluation may evaluate whether to provide a first distribution (such as distributing a first award to a first unique digital article) or to seize a first stake. For example, a second evaluation may evaluate whether to provide a second distribution (such as distributing a second award to a second unique digital article) or to seize a second stake, and so forth. In some implementations, one or more evaluations may further be based on eligibility information and/or sensitivity information (e.g., player-configurable sensitivity information). For example, sensitivity information may be specific to an individual unique digital article. For example, sensitivity information of an individual unique digital article may control evaluations regarding the individual unique digital article. For example, a first sensitivity may be specific to a first unique digital article, a second sensitivity may be specific to a second unique digital article, and so forth. In some implementations, sensitivity information for a particular unique digital article may be recorded on a permanent registry, e.g., as part of a set of usage information that controls usage by the owner of the particular unique digital article. In some implementations, sensitivity may be controllable and/or otherwise configurable by the owner (e.g., the owner of a particular unique digital article may turn sensitivity on or off per unique digital article, in other words activate or deactivate the sensitivity). In some implementations, sensitivity may be controllable and/or otherwise configurable by or through online gaming platform 105 (e.g., an operator or other stakeholder of online gaming platform 105 may turn sensitivity on or off for one or more unique digital articles, in other words activate or deactivate the sensitivity).

Reward component 131 may be configured to determine whether unique digital articles, other digital articles, accounts, and/or players 123 should receive one or more of information, awards, access to in-game content, access to game-specific communication channels, certificates, rewards, prizes, distribution gains, and/or virtual items. In some implementations, reward component 131 may be configured to determine whether particular in-game player-controllable virtual items participated in particular in-game events. As used herein, the term "event" (particularly, in-game event) may refer to in-game competitions, battles, races, hunts, searches, parties, concerts, celebrations, protests, and/or other actions, especially noteworthy ones. In some implementations, participation in an in-game event implies an accomplishment in the game, such as winning a competition, defeating an opponent in battle, beating an opponent in a race, succeeding in a hunt or search, attending a party or concert or celebration or protest, and/or other accomplishments (that may make an event noteworthy). In some implementations, an in-game event may be defined as a particular result of a particular in-game action. In some implementations, these types of determinations may be based on and/or responsive to actions by other components of system 100, including but not limited to registry-analysis component 120. As used herein, the term "award" may represent anything of value or use in system 100, or online gaming platform 105, or registry servers 111, or anything that can be exchanged or otherwise traded for something of such value or use, whether tangible or not, whether physical and/or virtual. In some implementations, online gaming platform 105 may determine a particular player is eligible to receive one or more rewards or awards. Distributions in accordance with the determined sensitivity may be made by distribution component 124. In some implementations, (one or more elements of) such eligible distributions may be adjusted and/or modified by adjustment component 126 prior to being distributed.

Sensitivity component 116 may be configured to determine and/or control sensitivity, eligibility, and/or availability of actions to players or to unique digital articles (e.g., modifications to recorded usage information). In some implementations, actions may include in-game actions. In some implementations, actions may include providing and/or using proof of in-game participation by a particular unique digital article (e.g., through operations by video generation component 127 and/or other components of system 100). In some implementations, actions may include distributions of awards, e.g., to unique digital articles. For example, the specific availability of a specific in-game action instruction (i.e., an in-game action instruction as requested) may require rights pertaining to a particular unique digital article. Sensitivity component 116 may be configured to determine and/or control sensitivity, eligibility, and/or availability of players or unique digital articles being exposed to consequences. For example, in some implementations, sensitivity to a specific (potential) distribution (or a series thereof) or a (potential) specific award (or a series thereof) may be configurable by the owner of a particular unique digital article (e.g., through configuring and/or modifying the set of usage information that controls usage of the particular unique digital article). Alternatively, and/or simultaneously, in some implementations, sensitivity to a specific (potential) distribution (or a series thereof) or a (potential) specific award (or a series thereof) may be configurable by or through online gaming platform 105 (e.g., an operator or administrative user or other stakeholder of online gaming platform 105 may turn sensitivity on or off for one or more unique digital articles). Alternatively, and/or simultaneously, in some implementations, sensitivity to a specific (potential) distribution (or a series thereof) or a (potential) specific award (or a series thereof) may be based on events in the real world (e.g., through real-world information from one or more real-world information servers 119). In some implementations, a particular sensitivity, eligibility, and/or availability of actions may be based on (or modified by virtue of) particular geolocation information associated with players or unique digital articles. Determinations by sensitivity component 116 may be used to control operations by other components of system 100, including but not limited to interaction component 110.

In some implementations, sensitivity component 116 may be configured to determine whether particular players are eligible to receive one or more participation rewards or attendance awards for either a particular unique digital article participating in an online event or attending an online event (e.g., during a particular time-limited duration, or between a begin time and an end time of the online event). Alternatively, and/or simultaneously, sensitivity component 116 may be configured to determine whether particular players are eligible to receive one or more participation rewards or attendance awards for participating in a real-world event or attending a real-world event (e.g., during a particular time-limited duration). In some implementations, sensitivity component 116 may be configured to determine whether particular players are eligible to receive distribution gains by virtue of owning distribution rights for one or more particular unique digital articles.

Performance component 118 may be configured to permit and/or perform requested in-game actions, e.g., to use particular unique digital articles. In some implementations, grants (or permissions) to use a particular unique digital article in accordance with a particular in-game action instruction may be granted based on one or more determinations by sensitivity component 116. For example, grants may be granted for certain requested in-game actions, but not for others. For example, particular requested in-game actions may be performed if requested by a first player, but not a second player. In some implementations, performance component 118 may permit and/or perform some types of requests, but not other types of requests. In some implementations, grants and/or performance may be prevented for certain types of requests, unless the pertinent (required) unique digital articles are currently recorded on a particular permanent registry as being owned by a particular player or account.

In some implementations, grants and/or performance by performance component 118 may require not only a particular type of request, but additionally may require the pertinent unique digital article (or other digital article that is not fungible) currently be recorded on a particular permanent registry (or a particular type of permanent registry). For example, a requirement for grants or performance may include recordation on a private permissioned permanent registry. In some implementations, actions by performance component 118 may be performed responsive to particular actions or results from other components of system 100, including but not limited to sensitivity component 116 and/or registry-analysis component 120.

Registry-analysis component 120 may be configured to determine whether one or more unique digital articles are recorded (on a particular permanent registry) as being owned by a particular player and/or account. For example, registry-analysis component 120 may determine whether a first unique digital article is currently recorded on a private permissioned permanent registry. In some implementations, registry-analysis component 120 may be configured to analyze recordations and other transactions on one or more permanent registries, e.g., by retrieving recorded information from the one or more permanent registries and analyzing whether any of the recorded transactions pertain to a particular unique digital article, or a set of unique digital articles. In some implementations, determinations by registry-analysis component 120 may be performed responsive to particular actions or results from other components of system 100, including but not limited to sensitivity component 116. In some implementations, registry-analysis component 120 may be configured to determine whether rights pertaining to a particular unique digital article has ever been recorded on a public permanent registry. For example, actions by other components of system 100, including but not limited to distribution component 124, may be responsive to determinations by registry-analysis component 120. In some implementations, determinations by registry-analysis component 120 may occur in real-time or near-real-time as needed for a particular in-game action instruction or request. In some implementations, determinations by registry-analysis component 120 may occur as needed when usage information pertaining to (unique) digital articles is modified, and results of such determinations are stored for later use by, e.g., online gaming platform 105, e.g., to be used when responding to a future in-game action instruction and/or a future request.

Video generation component 127 may be configured to generate sets of video information. In some implementations, a set or item of video information may depict a particular player-controllable virtual item participating in a particular (in-game) event, including but not limited to an in-game competition and/or another noteworthy event. In some implementations, operations by video generation component 127 may be performed responsive to determinations by reward component 131 and/or other components of system 100. In some implementations, a particular generated set of video information may be based on information that has been generated, captured, stored, and/or otherwise recorded by online gaming platforms 105 regarding the execution of the game. In some implementations, a particular generated set of video information may be based on information that has been generated, captured, stored, and/or otherwise recorded by a particular client computing platform 104, based on view information communicated to the particular client computing platform 104 regarding the execution of the game. For example, assume a specific player used a specific player-controllable character (associated with a specific unique digital article) to defeat a boss while playing in point-of-view (POV) mode. Assume reward component 131 determined defeating the boss qualifies as participating in a (noteworthy) event. Video generation component 127 may generate a set of video information (e.g., a 30-second video clip) depicting the specific player-controllable character defeating the boss. In some implementations, the 30-second video clip may depict the same view information as was communicated to the specific player during the event. In some implementations, the 30-second video clip may be based on the view information as was communicated to the specific player during the event. For example, the 30-second video clip may use a third-person view rather than a POV, showing a different view of the specific player-controllable character. In some implementations, the 30-second video clip may be re-created and/or approximated based on view information that was determined during execution of the game. For example, the 30-second video clip may add slow-motion, special effects, lighting effects, camera movement, zooming, a higher resolution, and/or other additions or changes to produce video information with more details (and/or higher cinematic quality) than the video information that was originally presented to the specific player during the event. For example, certain overlay information (such as, by way of non-limiting example, menus, maps, and communication windows) may be removed when producing the video information.

In some implementations, video generation component 127 may be configured to store generated sets of video information. For example, a set of video information may be stored in online gaming platform(s) 105. For example, a set of video information may be stored in external electronic storage, including but not limited to external resources 138, cloud-based storage, cloud storage, content-addressable memory/storage, decentralized storage, Inter-Planetary File System (IPFS), and/or other electronic storage that is external to one or more of online gaming platform(s) 105, registry server(s) 111, and/or system 100. A particular set of video information may be stored at a particular location (which may be referred to by a particular URL). In some implementations, generated video information may include video information captured in the real world or depicting the real world. For example, generated video information may be a combination of view information presented to the specific player during the event and captured real-world information.

Notification component 122 may be configured to notify players. For example, notification component 122 may notify players 123 in response to events, distributions, in-game action instructions, consequences, modifications of sensitivities, and/or other activities in system 100. For example, players 123 may be notified when sets of video information (e.g., depicting particular first in-game player-controllable virtual items participating in particular in-game events) have been added to the usage information of particular unique digital articles owned by players 123), or are available for access and/or viewing by players 123. In some implementations, a player may be notified responsive to a requested in-game action (as requested through an in-game action instruction) not being permitted or not being performed (e.g., as determined by performance component 118). In some implementations, actions by notification component 122 may be performed responsive to particular actions, results, determinations, evaluations, consequences, and/or decisions from other components of system 100, including but not limited to sensitivity component 116, performance component 118, and/or registry-analysis component 120. For example, notification component 122 may respond to a particular in-game action instruction (by a particular player, and pertaining to a particular unique digital article) with a particular response such that, responsive to a particular determination, the particular response notifies the particular player accordingly.

Geolocation component 129 may be configured to determine geolocation information. As used herein, "geolocation" refers to particular locations in the real world. The determined geolocation information may pertain to a real-world location associated with players (or their client computing platforms 104) and/or unique digital articles. For example, once a particular player has checked in at a particular location in the real world, the particular player may be associated with that particular location, at least until a newer association is made. In some implementations, the determined geolocation information may represent the current real-world location of a particular player. In some implementations, associations of players with particular locations may be in (pseudo-)real-time. For example, the current location of the particular client computing platform 104 that is being used to access system 100 and/or online gaming platform 105 may be associated with the particular player. In some implementations, players may be able to associate with a particular real-world location even if this is not their current actual location (e.g., by virtually attending an event that also has a real-world location, such as a concert). Players may choose to associate their unique digital articles with particular locations in the real world. By way of non-limiting example, geolocation component 129 may be configured to determine first geolocation information for a first current location of the first player, second geolocation information for a second current location of the second player, and so forth. In some implementations, geolocation component 129 may be configured to determine whether particular determined geolocation information meets a set of one or more (location-based) requirements. In some implementations, requirements may include location-based requirements, time-based requirements, and/or other requirements. For example, a particular location-based requirement may be whether a player's current location is the same location of some event in the real world (or, in some cases, within a predetermined distance from one or more GPS coordinates, such as, within half a mile, a mile, 2 miles, 3 miles, 5 miles, and/or another distance). For example, another location-based requirement may be whether a player's current location is in a set of locations that correspond to particular restaurants or bars (by way of non-limiting example, a set of sports bars, a set of college campuses, a set of professional sports arenas, a landmark, a particular national park, etc. etc.). Time-based requirements may be based on real-world time, such as, e.g., the current real-world time at a particular moment. For example, a particular time-based requirement may be whether a player's current location matches some event in the real world during that event. In some implementations, geolocation component 129 may be configured to determine a current real world time.

Distribution component 124 may be configured to distribute and/or otherwise provide one or more of information, awards, access to in-game content, access to game-specific communication channels, certificates, rewards, awards, prizes, distribution gains, and/or virtual items to players 123. In some implementations, distribution component 124 may be configured to effectuate consequences (e.g., in-game consequences), including positive consequences and negative consequences for unique digital articles. For example, for a positive consequence, distribution component 124 may provide a particular distribution of a particular award to a particular unique digital article or player, such that the pertinent account inventory is increased by the particular award. For example, for a negative consequence, distribution component 124 may seize a stake, so a particular player no longer controls or owns this stake.

Distributions by distribution component 124 may be adjusted, e.g., by adjustment component 126. In some implementations, distributions may be based on operations by sensitivity component 116. In some implementations, distributions may be responsive to determinations by reward component 131. In some implementations, distributions may be based on and/or responsive to actions by other components of system 100, including but not limited to registry server 111, a particular permanent registry, and/or registry-analysis component 120. For example, online gaming platform 105 may determine a particular player is eligible to receive one or more rewards or awards. Distribution component 124 may distribute the one or more rewards or awards in accordance with the determined sensitivity. For example, a reward may be a participation reward. For example, an award may be an attendance award (e.g., for a real world event). For example, a certificate may be a certificate of completion or accomplishment, which may be specific to actions within the instance of the game. For example, a prize may be for effort, time, and/or resources spent, specifically in the instance of the game. For example, particular unique digital articles may be associated with distribution rights, and the particular player who owns those distribution rights may receive distribution gains in accordance with those distribution rights. For example, distribution gains may result from a particular action or activity (such as, e.g., a sale of a particular digital article), e.g., within the online gaming platform 105, involving the particular digital article.

Adjustment component 126 may be configured to adjust and/or modify distributions, including (planned or expected) distributions by distribution component 124. In some implementations, adjustment component 126 may be configured to adjust and/or modify consequences, such as positive or negative consequences. In some implementations, adjustment component 126 may be configured to adjust and/or modify awards based on geolocation information (e.g., as determined by geolocation component 129, or based on whether one or more requirements are met, as determined by geolocation component 129). In some implementations, adjustment component 126 may adjust and/or modify one or more awards, certificates, rewards, awards, prizes, distribution gains, stakes, and/or virtual items that have been determined, e.g., by reward component 131 (also referred to as the determined distribution, the eligible distribution, or the determined consequence). Upon such adjustment and/or modification, this determined distribution (or eligible distribution) may be referred to as the adjusted distribution. Distribution component 124 may distribute the adjusted distribution. In some implementations, adjustments and/or modifications by adjustment component 126 may increase the value of one or more elements of the eligible distribution (this may provide a positive incentive to players). Alternatively, and/or simultaneously, adjustments and/or modifications by adjustment component 126 may decrease the value of one or more elements of the eligible distribution (this may provide a negative incentive to players, or, e.g., a positive incentive when decreasing the stake that is lost). In some implementations, actions by adjustment component 126 may be performed responsive to particular actions or results from other components of system 100, including but not limited to sensitivity component 116, geolocation component 129, and/or registry-analysis component 120.

Registry component 128 may be configured to generate sets of instructions for registry servers 111 (e.g., registry server 111a) and/or one or more permanent registries (e.g., blockchain 117a). In some implementations, registry component 128 may be configured to transfer the generated sets of instructions to registry servers 111 and/or one or more permanent registries. In some implementations, one or more of these instructions may instruct the formation of a smart contract and/or the recording of the smart contract on the one or more permanent registries (e.g., blockchain 117a). In some implementations, one or more of these instructions may call and/or otherwise invoke a method or function of a smart contract on the one or more permanent registries (e.g., blockchain 117a). In some implementations, these instructions may instruct registry servers 111 to record and/or modify unique digital articles, transactions, and/or rights on one or more permanent registries, or to analyze ownership as recorded on the one or more permanent registries. In some implementations, these instructions may instruct registry servers 111 to record and/or modify sets of usage information (e.g., ownership rights) pertaining to unique digital articles. For example, registry component 128 may transfer a particular set of instructions that, upon execution by blockchain 117a, issue a new unique digital article to a particular player or particular account (i.e., record the rights and/or other usage information pertaining to the new unique digital article, including it being owned by the particular player or the particular account). Individual unique digital articles may be associated with individual sets of usage information, including but not limited to ownership rights.

For example, registry component 128 may transfer a particular set of instructions that, upon execution by blockchain 117a and blockchain 117b, remove a particular unique digital article from blockchain 117a and add the particular unique digital article to blockchain 117b. For example, registry component 128 may transfer a particular set of instructions that, upon execution by blockchain 117a and blockchain 117b, analyze whether a particular player owns one or more particular unique digital articles. In some implementations, a particular set of instructions may modify the usage information for a particular unique digital article, to include or add metadata specific to the particular unique digital article. For example, metadata may include an identifier, a reference, a link, a Uniform Resource Locator (URL), and/or other information that refers to a particular location of stored information, or to the stored information itself. The stored information may include one or more sets of video information, e.g., as generated by video generation component 127. In some implementations, the recorded metadata for a particular unique digital article may include information (e.g., a checksum value, a hash value, a digital signature, etc.) that proves the authenticity and/or integrity of the information that refers to the particular location of particular stored information, or of the particular stored information itself.

Presentation component 133 may be configured to present interfaces (e.g., user interfaces 125) to players, e.g., through client computing platforms 104 associated with the respective players. In some implementations, presentation component 133 may be configured to effectuate presentations of interfaces to players 123. In some implementations, presentations by presentation component 133 may be performed jointly (or at least in some cooperative manner) with one or both of game component 108 and/or interaction component 110. Presentation component 133 may present video information to players 123. For example, a particular user interface 125 may present a particular player with the inventory of the player's account, including a particular unique digital article. The particular player may select a particular set of video information for presentation on the particular user interface 125, depicting participation in an in-game event involving the particular player. In some implementations, multiple sets of video information (related to different instances of participation) may be available for viewing by the particular player, and/or by other players. Presentation component 133 may present offers (e.g., for exchanges with other players) to particular players.

Receipt component 136 may be configured to receive (sets of) instructions to add, modify, analyze, and/or remove recorded information (e.g., usage information) in blockchain 117a. For example, receipt component 136 may receive one or more sets of instructions from registry component 128, online gaming platform 105, and/or other components of system 100. Receipt component 136 may provide received sets of instructions to record component 134 for execution. In some implementations, execution of individual ones of the instructions received may include invoking one or more function calls of an Application Programming Interface (API) 107. For example, API 107 may be configured to provide interactive communication between blockchain 117a and other components of system 100. For example, in some implementations, API 107 may support methods or functions that are implemented as function calls to smart contracts stored on blockchain 117a. For example, in some implementations, API 107 may support methods or functions that analyze whether a particular player owns one or more particular unique digital articles, one or more particular types of unique digital articles, and/or a particular collection of multiple unique digital articles. For example, in some implementations, API 107 may support methods or functions that return locations of stored video information pertaining to one or more particular unique digital articles. For example, in some implementations, API 107 may support methods or functions that analyze the status of a particular (type of) sensitivity for one or more particular unique digital articles. In some implementations, receipt component 136 may be arranged, organized, and/or otherwise included in registry server 111 and/or blockchain 117a.

Transaction component 134 may be configured to record information, including but not limited to (ownership) rights pertaining to digital articles, e.g., on one or more permanent registries, such as blockchain 117a. In some implementations, transaction component 134 may record information on electronic storage 130b. In some implementations, transaction component 134 may record and/or modify (usage) information on blockchain 117a. The information may include ownership rights, distribution rights, other rights, and/or other information. For example, particular recorded information may reflect rights pertaining to a particular digital article by a particular player or group of players. For example, a particular unique digital article may be associated with a three-dimensional in-game player-controllable item or character that can interact with other virtual items within online gaming platform 105. Recorded information may be specific to a digital article (i.e., article-specific). For example, distribution rights for a particular digital article may designate rights to certain distributions of awards upon a specifically defined in-game action (e.g., an exchange between players) involving the particular digital article.

In some implementations, transaction component 134 may be configured to record information in blockchain 117a. In some implementations, transaction component 134 may add, modify, analyze, and/or remove recorded information. For example, in accordance with received instructions from receipt component 136, transaction component 134 may transfer rights pertaining to a particular digital article from a first owner to a second owner (e.g., from an original owner to a new owner, or from a loser of a challenge to a winner of the challenge) such that the recorded information on blockchain 117a no longer reflect the rights pertaining to the particular digital article by the first player. In some implementations, in accordance with received instructions, transaction component 134 may transfer rights pertaining to a particular digital article temporarily, e.g., from a first owner to a temporary second owner such as a smart contract. In some case, a temporary owner may be a holding account that is merely used until ownership is transferred to either the original owner or a new owner. As used herein, the term "temporary" (and derivatives thereof) refers to a transfer or to ownership that is either known to be changed and/or modified within a predetermined period, or expected to be changed and/or modified within a predetermined period. Conversely, a non-temporary transfer from a first owner to a second owner (due to a particular exchange) can conceivably be changed and/or reverted (back from the second owner to the first owner) due to a separate and new exchange that is independent of the first particular exchange. In some implementations, in accordance with received instructions, transaction component 134 may transfer rights pertaining to a particular digital article non-temporarily from a first owner to a second owner, e.g., when a particular exchange is not reversible or no longer reversible. In some implementations, transaction component 134 may be arranged, organized, and/or otherwise included in blockchain 117a.

In some implementations, transaction component 134 may be configured to obtain article-specific information (e.g., metadata, usage information, ownership rights, distribution rights, sensitivity information, and/or other information) for particular digital articles. In some implementations, transaction component 134 may be configured to access blockchain 117*a* to obtain or modify the article-specific information (that are recorded on blockchain 117*a*, e.g., in one or more smart contracts).

Input component 135 may be configured to receive user input from administrative users. For example, the user input may include entry and/or selection of particular information, unique digital articles, types of digital articles, virtual items, types of virtual items, types of characters, and/or any entity or object that interacts with any part of system 100 and/or plays a part in the operation of system 100. For example, an administrative user may select a particular set of unique digital articles (e.g., all "Camo Blankos" that have been issued, or all Blankos at a particular event) as the input set of unique digital articles for other components of system 100, such as sensitivity component 116. Additionally, in some implementations, the administrative user may select a particular adjustment to be enacted by adjustment component 126 (e.g., increase the value of one or more elements of an award or distribution) for one or more types of determinations by reward component 131 (e.g., an eligible distribution of a reward of 100 virtual coins for leveling up a unique digital article in the selected set of unique digital articles). As another example, the administrative user may select a different set of unique digital articles (e.g., all "Boss Dino Blankos" that have been issued) as the input set of unique digital articles for other components of system 100. Additionally, the administrative user may select a particular adjustment to be enacted by adjustment component 126 (e.g., decrease the value of one or more elements of the eligible distribution, or decreases the stake for a determined consequence) for one or more types of determinations by reward component 131 (e.g., an eligible distribution may be receiving the distribution gains based on particular in-game actions for unique digital articles in the selected set of unique digital articles).

Communication component 137 may be configured to facilitate communication and/or interaction between administration server 115 and the rest of system 100. For example, communication component 137 may communicate user input received from administrative users by input component 135 to other components of system 100, particularly online gaming platform 105.

Transformation component 139 may be configured to determine information. In some implementations, transformation component 139 may determine real-world information based on events that have occurred in the real world (e.g., based on event information regarding the events that are occurring and/or have occurred in the real world). In some implementations, real-world information (and/or the events they are based on) may be deterministic. In some implementations, real-world information (and/or the events they are based on) may be quantifiable. In some implementations, real-world information (and/or the events they are based on) may be measurable. In some implementations, transformation component 139 may be configured to receive the event information regarding the events that are occurring and/or have occurred in the real world, and the determined information may be based on this received event-information. Transformation component 139 may transform information about the real world into real-world information for use by other components of system 100. In some implementations, real-world information may include geolocation information pertaining to the events that have occurred in the real world. For example, real-world information for a particular competition may include not only the results of that competition, but also geolocation information regarding the particular competition itself, or one or more competitor(s), and/or other locations that are related to this particular competition. In some implementations, transformation component 139 may be part of real-world information server 119.

Transfer component 141 may be configured to transfer information to other components of system 100, including but not limited to registry server 111 and/or a permanent registry. The transferred information may be determined by another component of system 100, including but not limited to transformation component 139. In some implementations, transfer component 141 may be configured to transfer a combination of real-world information and geolocation information to registry server 111 and/or a permanent registry. In some implementations, transfer component 141 may be part of real-world information server 119.

Figure 3:
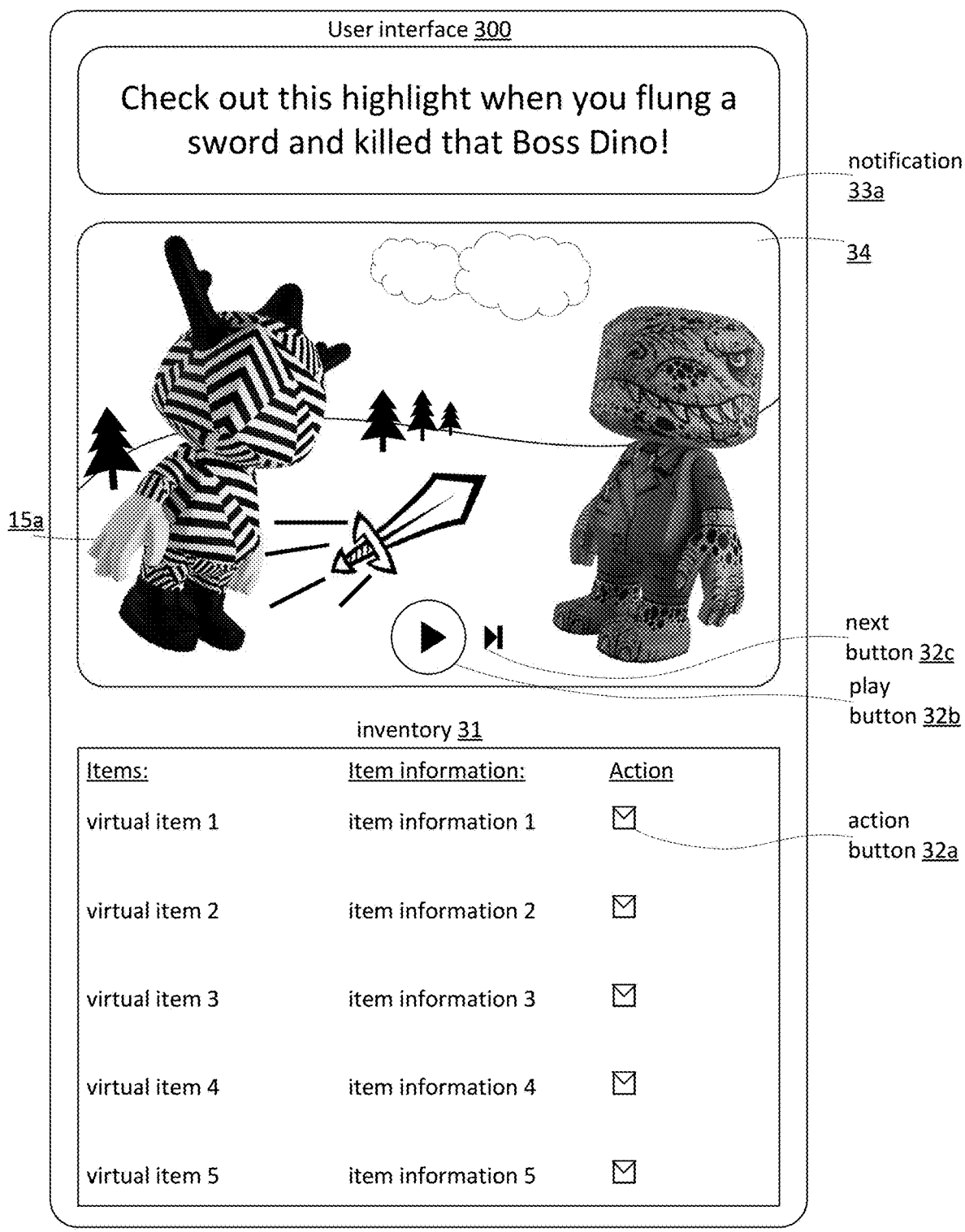
FIG. 3 illustrates an example implementation of a player interface, as may be used by a system configured to provide and use proof of in-game participation by unique digital articles, in accordance with one or more implementations.

FIG. 3 illustrates an example implementation of a user interface 300 as may be used by system 100, in accordance with one or more implementations. User interface 300 may enable a particular player (say, "Alice", not depicted) to view and/or use an account inventory and/or one or more unique digital articles controlled by the particular player. User interface 300 may include a section or field for account inventory 31, and/or other graphical player interface elements. As depicted, account inventory 31 may include a list of different virtual items and/or articles currently controlled by Alice, including virtual items 1-2-3-4-5. Account inventory 31 further depicts item information regarding these virtual items, as indicated by item information 1-2-3-4-5, which correspond to virtual items 1-2-3-4-5, respectively. Account inventory 31 as depicted may further include graphical user interface elements such as, by way of non-limiting example, an action button 32*a* (which initiates an in-game action instruction). Upon engagement by Alice, in-game action instruction button 32*a* may request "virtual item 1" to be used/selected for a particular request (e.g., through a text field or a dropdown menu, as indicated by a triangle in a box). For example, Alice may request to view video clips of noteworthy events unique digital article 15*a* has participated in. User interface 300 as depicted may further include graphical user interface elements such as, by way of non-limiting example, a video clip viewer 34, a notification element 33*a*, and/or other graphical user interface elements. Notification element 33*a* notifies the particular player regarding a particular noteworthy event unique digital article 15 participated in: "Check out this highlight when you flung a sword and killed that Boss Dino!" Video clip viewer 34 depicts the particular noteworthy event, and will play the related video clip when the player selects play button 32*b*. Video clip viewer 34 may play another video clip (related to another noteworthy event unique digital article 15 participated in) when the player selects next button 32*c*. For example, another virtual item in user inventory 31 may be the particular sword used in the same noteworthy event, and video clip viewer 34 could play the same or a similar video clip assuming this sword is correlated and/or associated to its own unique digital article.

Figure 5A:
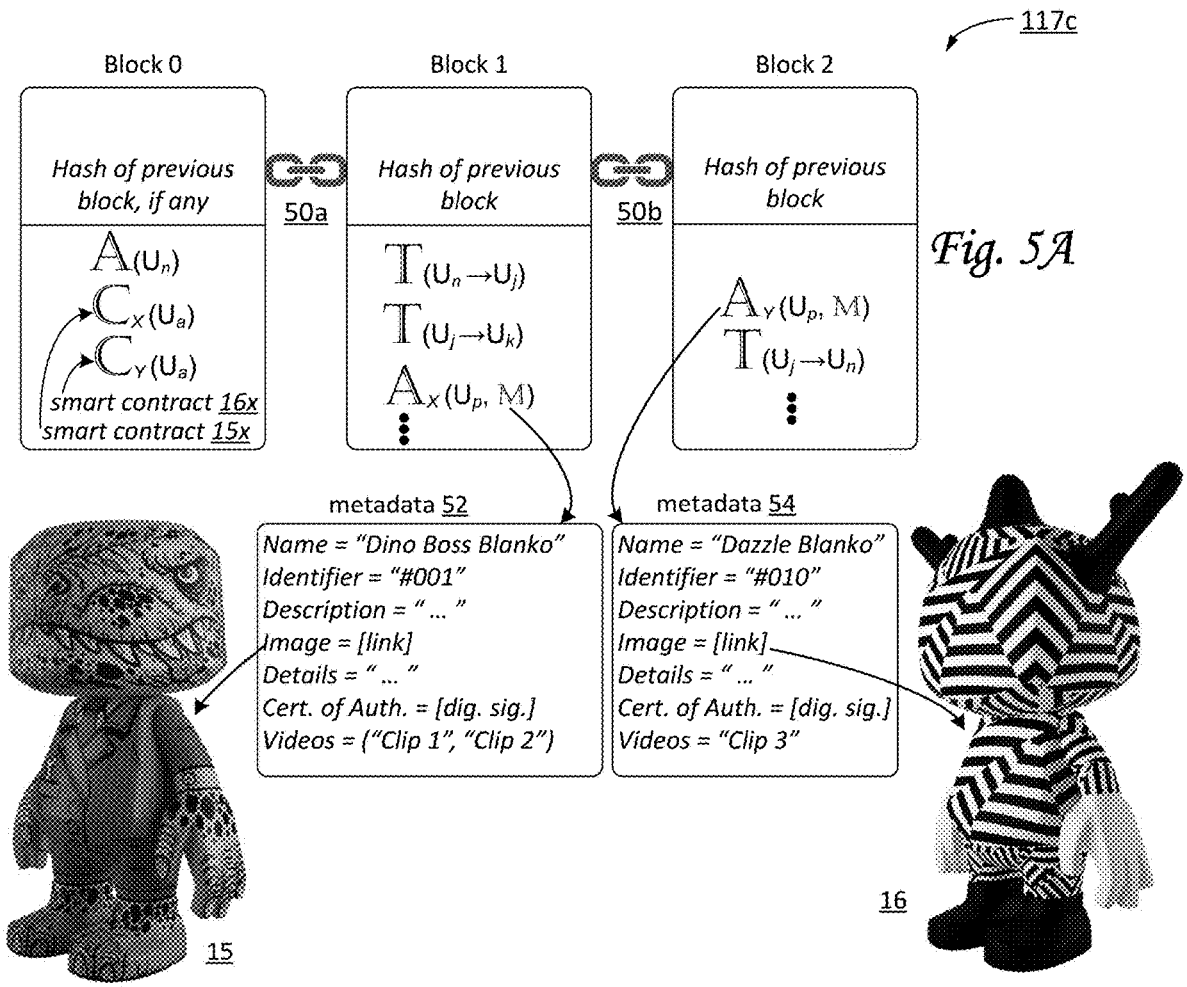
FIGS. 5A-5B illustrate exemplary permanent registries, as may be used by a system configured to provide and use proof of in-game participation by unique digital articles, in accordance with one or more implementations.

FIG. 5A illustrate exemplary blockchain 117*c* as may be used by system 100, in accordance with one or more implementations. FIG. 5A illustrates a blockchain 117*c* that includes a block 0, a block 1, and a block 2. As time progresses, more blocks may be added to blockchain 117*c*.

The blocks within blockchain 117c are ordered. In block 0, one article (indicated by a capital "A") is generated and/or assigned to player "n" ($U_n$). A second digital article, a smart contract 15x is assigned to player "a" ($U_a$), and a third digital article, a smart contract 16x, is assigned to player "a" ($U_a$), which may be an administrative user. For example, smart contract 15x and smart contract 16x may be or include templates for issuing particular types of unique digital articles. Smart contract 15x and smart contract 16x may have been posted to blockchain 117c by a component similar to record component 134.

For example, the articles in block 0 may include individual ownership rights recorded for particular digital articles within an online gaming platform, similar to or the same as online game platform 105. Block 1 is connected to block 0 (as indicated by a link 50a), for example by including an address of block 1 in block 0, or vice versa. Likewise, block 1 is connected to block 2, as indicated by a link 50b. In block 1, a transaction to smart contract 15x (indicated by "Ax") is recorded. Transaction Ax to smart contract 15x may issue a unique digital article to player "p", the unique digital article being defined by metadata 52. Here, metadata 52 is correlated to a player-controllable character named "Boss Dino Blanko", having identifier "#001", as depicted by a linked image of unique digital article 15, as well as including various other fields of information, including a digital signature that serves as a certificate of authenticity, and a list of videos depicting proof of participation by this "Boss Dino Blanko" in particular in-game events. Here, the list of videos includes "Clip 1" and "Clip 2". In block 1, another transactions from player "n" to player "j", and from player "j" to player "k" are also recorded. In block 2, several transactions may be recorded: a transaction from player "j" to player "n", and a transaction to smart contract 16x (indicated by "Ay") is recorded. Transaction Ay to smart contract 16x may issue a unique digital article to player "p", the unique digital article being defined by metadata 54 (here, correlated to a player-controllable character named "Dazzle Blanko", having identifier "#010", as depicted by a linked image of unique digital article 16, as well as including various other fields of information, with a video labeled "Clip 3"). In block 2, another transaction is recorded, from player "j" to player "n".

Figure 5B:
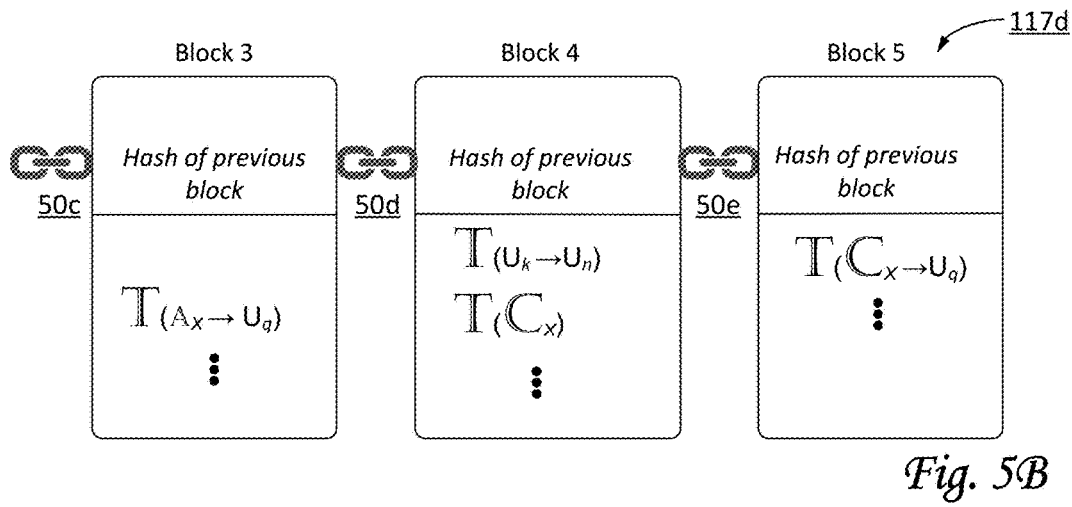

By way of non-limiting example, FIG. 5B illustrates a blockchain 117d that includes several blocks (block 3, block 4, block 5), that have been appended to blockchain 117c. Block 3 may be connected to block 2 (as indicated by link 50c), block 4 may be connected to block 3 (as indicated by a link 50d), and block 5 may be connected to block 4 (as indicated by a link 50e). In block 3, another transaction may be recorded that modifies the rights pertaining to the unique digital article (indicated by "Ax" and defined by metadata 52) to player "q", such that player "p" no longer owns this "Boss Dino Blanko". Block 4 includes a transaction (indicated by a capital "T") from player "k" to player "n". For example, the transaction may represent a purchase of a first virtual item by player "n" from seller player "k". Additionally, block 4 includes a transaction to smart contract 15x. For example, this transaction may represent the addition of another video clip to metadata 52 (e.g., this list of videos now includes "Clip 1", "Clip 2", and "Clip 4"), which may be proof of this "Boss Dino Blanko" participating in another noteworthy in-game event (this time while controlled by player "q" as the owner). Block 5 includes a transaction from smart contract 15x to player "q", which may represent the distribution of an award to this user, e.g., due to heroic events depicted in the most recently added video clip linked in metadata 52 of this "Boss Dino Blanko". Player "p" still owns a "Dazzle Blanko", linking to a single video clip.

Figure 4:
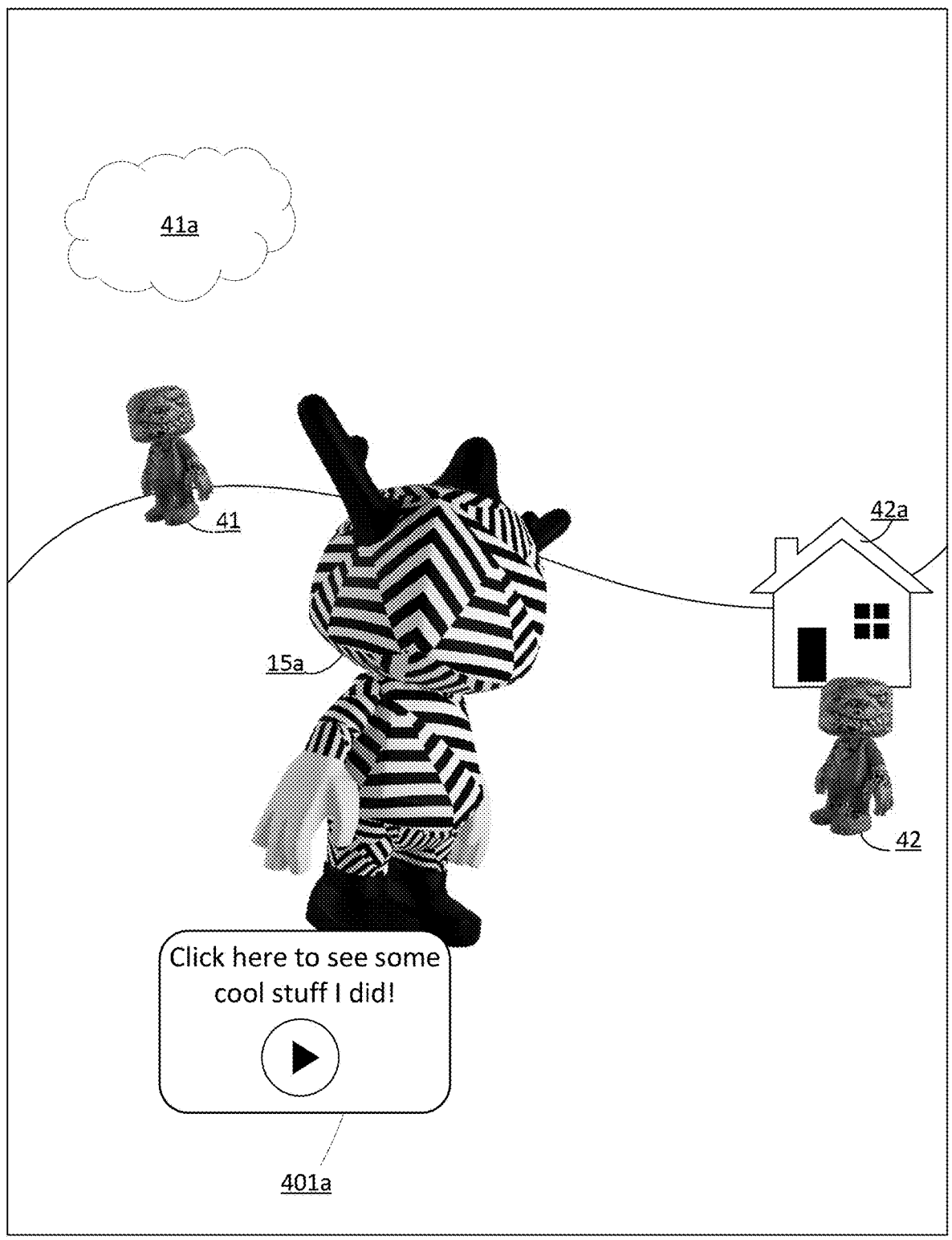
FIG. 4 illustrates an exemplary view of interactive gameplay in an instance of a game, as may be used by a system configured to provide and use proof of in-game participation by unique digital articles, in accordance with one or more implementations.

By way of non-limiting example, FIG. 4 depicts a view 400 of interactive gameplay by a particular player (say, "Alice", not depicted), using unique digital article 15a (depicted as a particular in-game player-controllable character). Other players may be active and present in view 400 (depicting a topography of a simulated space included in the instance of a game), for example a first player-controllable character 41 (standing below a cloud 41a), and a second player-controllable character 42 (standing near an in-game structure 42a that looks like a house). As the results of previous participation by unique digital article 15a in (noteworthy) events, Alice (or any other player in this game) may be notified as indicated by an interactive notification 401a, labeled "Click here to see some cool stuff I did!", and including a play button.

Referring to FIG. 1, user interfaces 125 may be configured to facilitate interaction between players 123 and system 100 and/or between players 123 and client computing platforms 104. For example, user interfaces 125 may provide an interface through which players 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other player interface devices configured to receive and/or convey player input. In some implementations, one or more user interfaces 125 may be included in one or more client computing platforms 104. In some implementations, one or more user interfaces 125 may be included in system 100. In some implementations, user interface 125 may be a type of interface that facilitates the exchange of virtual items between players.

Referring to FIG. 1, in some implementations, online gaming platforms 105, server(s) 102, client computing platform(s) 104, administration servers 115, registry servers 111, real-world information servers 119, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which online gaming platforms 105, server(s) 102, client computing platform(s) 104, administration servers 115, registry servers 111, and/or external resources 138 may be operatively linked via some other communication media.

A given client computing platform 104 may include one or more processors configured to execute computer program components. The computer program components may be configured to enable an expert or player associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms. In some implementations, individual client computing platforms 104 may be configured to determine geolocation information for a current location of the individual client computing platforms 104. For example, an individual client computing platform 104 may include a geolocation sensor (e.g., a Global Positioning System or GPS device). The geolocation sensor may be configured to generate output signals conveying GPS information (e.g., a set or range of GPS coordinates) and/or other geolocation information, which may be used by the individual client computing platform 104 to determine the current location of the individual client computing platform 104.

Administration server(s) 115 may include one or more of servers 102a, processors 132a, machine-readable instructions 106a, electronic storage 130a, and/or other components. Server(s) 102a may be configured by machine-readable instructions 106a. Machine-readable instructions 106a may include one or more instruction components. The instruction components may include one or more of input component 135, communication component 137, and/or other instruction components. Administration server 115 may include communication lines, or ports to enable the exchange of information with a network and/or other computing platforms. In some implementations, administration servers 115 may be used by one or more administrative users, e.g., to configure and/or control operation of system 100. In some implementations, administrative servers 115 may include or player one or more player interfaces to receive player input and/or otherwise interact with one or more administrative users.

External resources 138 may include sources of information outside of system 100, external entities participating with system 100, external providers of computation and/or storage services, and/or other resources. In some implementations, some or all of the functionality attributed herein to external resources 138 may be provided by resources included in system 100. In some implementations, one or more external resources 138 may provide information (e.g., event information regarding events that are occurring and/or have occurred in the real world) to transformation component 139, real-world information server 119, and/or other components of system 100. In some implementations, external resources 138 may include one or more real-world information servers or blockchain oracles.

Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, 124, 126, 127, 128, 129, 131, 133, 134, 135, 136, 137, 139, and/or 141, and/or other components. Processor(s) 132 may be configured to execute components 108, 110, 112, 114, 116, 118, 120, 122, 124, 126, 127, 128, 129, 131, 133, 134, 135, 136, 137, 139, and/or 141, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, 126, 127, 128, 129, 131, 133, 134, 135, 136, 137, 139, and/or 141 are illustrated in FIG. 1 as being implemented within a single processing unit, in implementations in which processor(s) 132 includes multiple processing units, one or more of components 108, 110, 112, 114, 116, 118, 120, 122, 124, 126, 127, 128, 129, 131, 133, 134, 135, 136, 137, 139, and/or 141 may be implemented remotely from the other components. The description of the functionality provided by the different components 108, 110, 112, 114, 116, 118, 120, 122, 124, 126, 127, 128, 129, 131, 133, 134, 135, 136, 137, 139, and/or 141 described below is for illustrative purposes only, and is not intended to be limiting, as any of components 108, 110, 112, 114, 116, 118, 120, 122, 124, 126, 127, 128, 129, 131, 133, 134, 135, 136, 137, 139, and/or 141 may provide more or less functionality than is described. For example, one or more of components 108, 110, 112, 114, 116, 118, 120, 122, 124, 126, 127, 128, 129, 131, 133, 134, 135, 136, 137, 139, and/or 141 may be eliminated, and some or all of its functionality may be provided by other ones of components 108, 110, 112, 114, 116, 118, 120, 122, 124, 126, 127, 128, 129, 131, 133, 134, 135, 136, 137, 139, and/or 141. As another example, processor(s) 132 may be configured to execute one or more additional components that may perform some or all of the functionality attributed below to one of components 108, 110, 112, 114, 116, 118, 120, 122, 124, 126, 127, 128, 129, 131, 133, 134, 135, 136, 137, 139, and/or 141.

Figure 2:
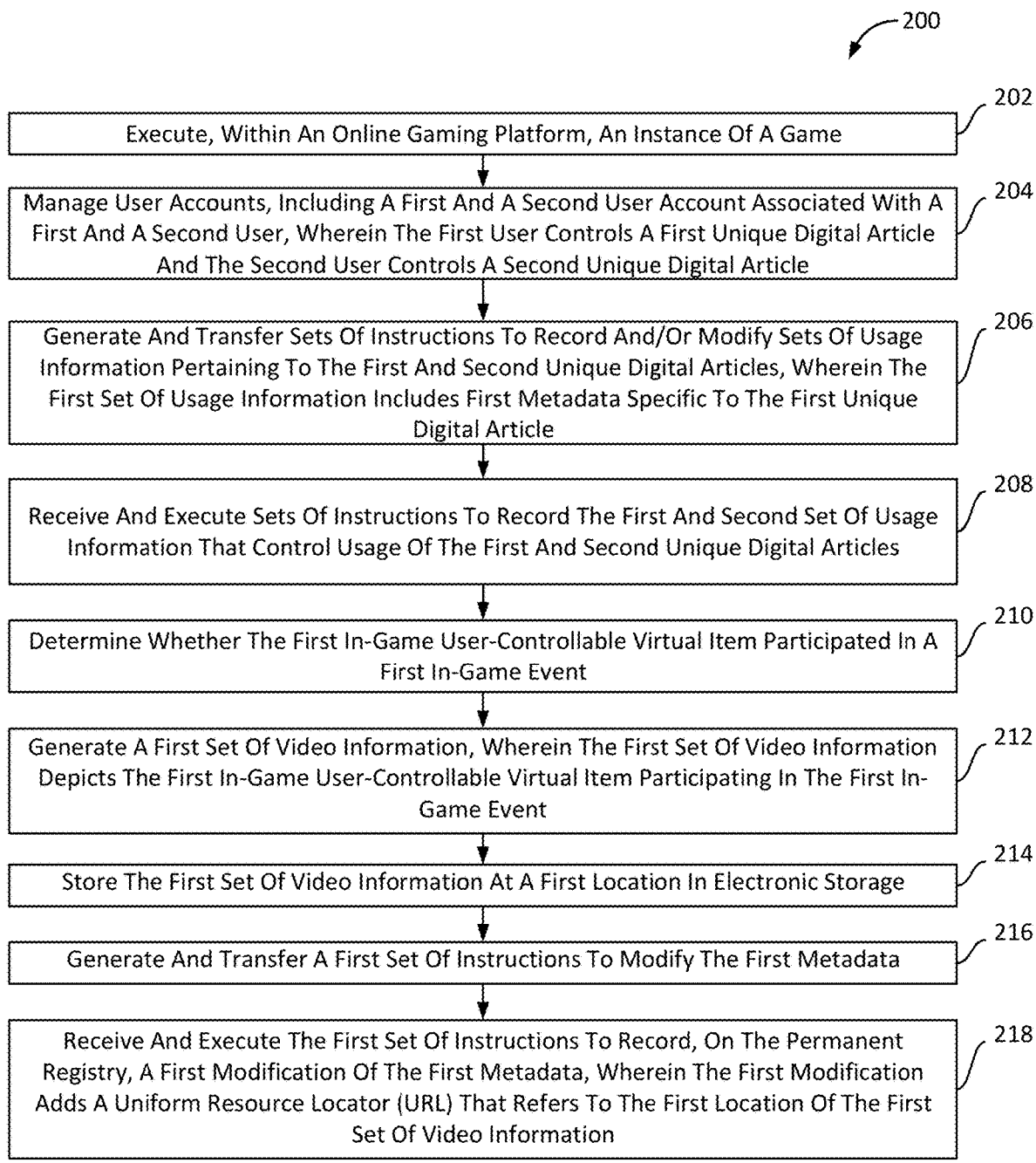
FIG. 2 illustrates a method of providing and using proof of in-game participation by unique digital articles, in accordance with one or more implementations.

FIG. 2 illustrates a method 200 of providing and using proof of in-game participation by unique digital articles, wherein the unique digital articles are associated with in-game player-controllable virtual items usable in instances of games within an online gaming platform, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of a game is executed within the online gaming platform to facilitate presentation of the game to players, and in-game actions are implemented in the instance of the game in response to in-game action instructions for the in-game actions by the players. Presentation of the game is based on views of the game that are determined during execution of the instance of the game. The players include a first player and a second player. In some embodiments, operation 202 is performed by a game component and/or an interaction component the same as or similar to game component 108 and/or interaction component 110 (shown in FIG. 1 and described herein).

At an operation 204, player accounts associated with the players are managed. The player accounts include a first player account associated with the first player and a second player account associated with the second player. The first player account includes a first account inventory of a first set of virtual items. The second player account includes a second account inventory of a second set of virtual items. The first player controls the first set of virtual items in the first account inventory. The second player controls the second set of virtual items in the second account inventory. The first account inventory includes a first unique digital article that is associated with a first in-game player-controllable virtual item configured to be used in the instance of the game. The second account inventory includes a second unique digital article that is associated with a second in-game player-controllable virtual item configured to be used in the instance of the game. In some embodiments, operation 204 is performed by an account component the same as or similar to account component 112 (shown in FIG. 1 and described herein).

At an operation 206, sets of instructions are generated and transferred to record and/or modify a first set of usage information pertaining to the first unique digital article and a second set of usage information pertaining to the second unique digital article. The first set of usage information includes first metadata specific to the first unique digital article. In some embodiments, operation 206 is performed by a registry component the same as or similar to registry component 128 (shown in FIG. 1 and described herein).

At an operation 208, a first and a second set of instructions are received and executed. The first set of instructions is to record, on a permanent registry implemented by a registry server, the first set of usage information. The first set of usage information controls usage by the first player of the first unique digital article. The second set of instructions is to record, on the permanent registry, the second set of usage information. The second set of usage information controls usage by the second player of the second unique digital article. In some embodiments, operation 208 is performed by a receipt component and/or a transaction component the same as or similar to receipt component 136 and/or transaction component 134 (shown in FIG. 1 and described herein).

At an operation 210, it is determined whether the first in-game player-controllable virtual item participated in a first in-game event. In some embodiments, operation 210 is performed by a reward component the same as or similar to reward component 131 (shown in FIG. 1 and described herein).

At an operation 212, a first set of video information is generated. The first set of video information depicts the first in-game player-controllable virtual item participating in the first in-game event. In some embodiments, operation 212 is performed by a video generation component the same as or similar to video generation component 127 (shown in FIG. 1 and described herein).

At an operation 214, the first set of video information is stored at a first location in electronic storage. In some embodiments, operation 214 is performed by a video generation component the same as or similar to video generation component 127 (shown in FIG. 1 and described herein).

At an operation 216, a first set of instructions is generated and transferred to modify the first metadata. In some embodiments, operation 216 is performed by a registry component the same as or similar to registry component 128 (shown in FIG. 1 and described herein).

At an operation 218, the first set of instructions is received and executed to record, on the permanent registry, a first modification of the first metadata. The first modification adds a Uniform Resource Locator (URL) that refers to the first location of the first set of video information. In some embodiments, operation 218 is performed by a receipt component and/or a transaction component the same as or similar to receipt component 136 and/or transaction component 134 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A system configured to provide and use proof of in-game participation by unique digital articles, wherein the unique digital articles are associated with in-game player-controllable virtual items configured to be used in instances of games within an online gaming platform, the system comprising:

the online gaming platform including one or more hardware processors configured by machine-readable instructions to:

execute, within the online gaming platform, an instance of a game to facilitate presentation of the game to players, and implement in-game actions in the instance of the game in response to in-game action instructions for the in-game actions by the players, wherein presentation of the game is based on views of the game that are determined during execution of the instance of the game, wherein the players include a first player and a second player;

manage player accounts associated with the players, wherein the player accounts include a first player account associated with the first player and a second player account associated with the second player, wherein the first player controls a first unique digital article that is associated with a first in-game player-controllable virtual item configured to be used in the instance of the game, wherein the second player controls a second unique digital article that is associated with a second in-game player-controllable virtual item configured to be used in the instance of the game; and generate and transfer sets of instructions to record and/or modify a first set of usage information pertaining to the first unique digital article and a second set of usage information pertaining to the second unique digital article, wherein the first set of usage information includes first metadata specific to the first unique digital article;

a registry server including one or more processors configured by one or more machine-readable instructions to:

implement a permanent registry; and receive and execute (i) a first set of instructions to record, on the permanent registry, the first set of usage information, wherein the first set of usage information controls usage by the first player of the first unique digital article, and (ii) a second set of instructions to record, on the permanent registry, the second set of usage information, wherein the second set of usage information controls usage by the second player of the second unique digital article;

wherein the one or more hardware processors included in the online gaming platform are further configured to:

determine whether the first in-game player-controllable virtual item participated in a first in-game event;

responsive to determining the first in-game player-controllable virtual item participated in the first in-game event, generate a first set of video information, wherein the first set of video information depicts the first in-game player-controllable virtual item participating in the first in-game event; and store the first set of video information at a first location in electronic storage;

generate and transfer a third set of instructions to modify the first metadata; and wherein the one or more processors included in the registry server are further configured to:

receive and execute the third set of instructions to record, on the permanent registry, a first modification of the first metadata, wherein the first modification adds a Uniform Resource Locator (URL) that refers to the first location of the first set of video information.

2. The system of claim 1, wherein at least a portion of the first metadata is recorded on the permanent registry.

3. The system of claim 1, wherein the first location in electronic storage is either electronic storage associated with the online gaming platform or external electronic storage that is external to the system and to the online gaming platform.

4. The system of claim 1, wherein the first in-game event includes at least one of a competition, a battle, a race, a hunt, and a search.

5. The system of claim 1, wherein participation in the first in-game event implies an in-game accomplishment by the first player.

6. The system of claim 1, wherein the first set of video information is based on the views of the game, determined during the execution of the instance of the game, that are specific to the first player controlling the first in-game player-controllable virtual item during occurrence of the first in-game event.

7. The system of claim 1, wherein the one or more hardware processors configured by machine-readable instructions to:

present, through a user interface on a client computing platform, information regarding the first in-game player-controllable virtual item to the first player, wherein the information includes the first set of video information.

8. The system of claim 1, wherein the one or more hardware processors configured by machine-readable instructions to:

present, on a client computing platform, a user interface to the first player, wherein the user interface is configured to receive player input from the first player, wherein the first user interface enables, through the player input, the player to:

transfer the first unique digital article from the permanent registry to a public permanent registry such that, subsequent to the transfer, the first unique digital article is no longer recorded on the permanent registry but is recorded on the public permanent registry.

9. The system of claim 8, wherein the first set of video information is accessible to any user of the public permanent registry.

10. The system of claim 1, wherein the first in-game player-controllable virtual item is a first in-game player-controllable character, wherein the first set of video information further depicts either the first player or the first in-game player-controllable character attending a particular real-world event within a particular time frame.

11. A method of providing and using proof of in-game participation by unique digital articles, wherein the unique digital articles are associated with in-game player-controllable virtual items usable in instances of games within an online gaming platform, the method comprising:

executing, within the online gaming platform, an instance of a game to facilitate presentation of the game to players, and implementing in-game actions in the instance of the game in response to in-game action instructions for the in-game actions by the players, wherein presentation of the game is based on views of the game that are determined during execution of the instance of the game, wherein the players include a first player and a second player;

managing player accounts associated with the players, wherein the player accounts include a first player account associated with the first player and a second player account associated with the second player, wherein the first player controls a first unique digital article that is associated with a first in-game player-controllable virtual item configured to be used in the instance of the game, wherein the second player controls a second unique digital article that is associated with a second in-game player-controllable virtual item configured to be used in the instance of the game;

generating and transferring sets of instructions to record and/or modify a first set of usage information pertaining to the first unique digital article and a second set of usage information pertaining to the second unique digital article, wherein the first set of usage information includes first metadata specific to the first unique digital article;

receiving and executing (i) a first set of instructions to record, on the permanent registry, the first set of usage information, wherein the first set of usage information controls usage by the first player of the first unique digital article, and (ii) a second set of instructions to record, on the permanent registry, the second set of usage information, wherein the second set of usage information controls usage by the second player of the second unique digital article;

determining whether the first in-game player-controllable virtual item participated in a first in-game event;

responsive to determining the first in-game player-controllable virtual item participated in the first in-game event, generating a first set of video information, wherein the first set of video information depicts the first in-game player-controllable virtual item participating in the first in-game event;

storing the first set of video information at a first location in electronic storage;

generating and transferring a third set of instructions to modify the first metadata; and receiving and executing the third set of instructions to record, on the permanent registry, a first modification of the first metadata, wherein the first modification adds a Uniform Resource Locator (URL) that refers to the first location of the first set of video information.

12. The method of claim 11, wherein at least a portion of the first metadata is recorded on the permanent registry.

13. The method of claim 11, wherein the first location in electronic storage is either electronic storage associated with the online gaming platform or external electronic storage that is external to the system and to the online gaming platform.

14. The method of claim 11, wherein the first in-game event includes at least one of a competition, a battle, a race, a hunt, and a search.

15. The method of claim 11, wherein participation in the first in-game event implies an in-game accomplishment by the first player.

16. The method of claim 11, wherein the first set of video information is based on the views of the game, determined during the execution of the instance of the game, that are specific to the first player controlling the first in-game player-controllable virtual item during occurrence of the first in-game event.

17. The method of claim 11, further comprising:

presenting, through a user interface on a client computing platform, information regarding the first in-game player-controllable virtual item to the first player, wherein the information includes the first set of video information.

18. The method of claim 11, further comprising:

presenting, on a client computing platform, a user interface to the first player, wherein the user interface is configured to receive player input from the first player, wherein the first user interface enables, through the player input, the player transferring the first unique digital article from the permanent registry to a public permanent registry such that, subsequent to the transfer, the first unique digital article is no longer recorded on the permanent registry but is recorded on the public permanent registry.

19. The method of claim 18, wherein the first set of video information is accessible to any user of the public permanent registry.

20. The method of claim 11, wherein the first in-game player-controllable virtual item is a first in-game player-controllable character, wherein the first set of video information further depicts either the first player or the first in-game player-controllable character attending a particular real-world event within a particular time frame.

* * * * *